United States Patent
Mizuno et al.

(10) Patent No.: US 9,337,461 B2
(45) Date of Patent: May 10, 2016

(54) COMPOSITE POROUS MEMBRANE AND METHOD OF PRODUCING THE SAME

(75) Inventors: Naoki Mizuno, Tochigi (JP); Michihiko Irie, Tochigi (JP); Yoshitaka Ayuzawa, Tochigi (JP); Masanori Nakamura, Tochigi (JP)

(73) Assignee: Toray Battery Separator Film Co., Ltd. (JP)

( * ) Notice: Subject to any disclaimer, the term of this patent is extended or adjusted under 35 U.S.C. 154(b) by 579 days.

(21) Appl. No.: 13/820,279

(22) PCT Filed: Aug. 29, 2011

(86) PCT No.: PCT/JP2011/069410
§ 371 (c)(1),
(2), (4) Date: Apr. 18, 2013

(87) PCT Pub. No.: WO2012/029699
PCT Pub. Date: Mar. 8, 2012

(65) Prior Publication Data
US 2013/0330592 A1  Dec. 12, 2013

(30) Foreign Application Priority Data

Sep. 2, 2010  (JP) ................... 2010-196759

(51) Int. Cl.
| | |
|---|---|
| *H01M 2/14* | (2006.01) |
| *H01M 2/16* | (2006.01) |
| *B32B 27/32* | (2006.01) |
| *B32B 27/34* | (2006.01) |
| *B32B 5/32* | (2006.01) |
| *B32B 27/08* | (2006.01) |
| *B32B 27/28* | (2006.01) |
| *B32B 27/36* | (2006.01) |
| *H01G 11/52* | (2013.01) |
| *H01G 9/02* | (2006.01) |

(52) U.S. Cl.
CPC ............... *H01M 2/1653* (2013.01); *B32B 5/32* (2013.01); *B32B 27/08* (2013.01); *B32B 27/281* (2013.01); *B32B 27/32* (2013.01); *B32B 27/34* (2013.01); *B32B 27/36* (2013.01); *H01G 11/52* (2013.01); *H01M 2/145* (2013.01); *B32B 2255/10* (2013.01); *B32B 2255/26* (2013.01); *B32B 2266/025* (2013.01); *B32B 2266/0214* (2013.01); *B32B 2266/0257* (2013.01); *B32B 2307/306* (2013.01); *B32B 2457/10* (2013.01); *H01G 9/02* (2013.01); *H01M 2300/0094* (2013.01); *Y02E 60/13* (2013.01)

(58) Field of Classification Search
CPC ......... H01M 2/14; H01M 2/145; H01M 2/16; H01M 2/1653; H32B 27/08; H32B 27/281; H32B 27/32; H32B 27/27; H32B 27/34; H32B 27/36; H32B 5/32; H01G 9/02
See application file for complete search history.

(56) References Cited

U.S. PATENT DOCUMENTS

2010/0136430 A1* 6/2010 Lee .......................... H01B 1/24
429/223

FOREIGN PATENT DOCUMENTS

| JP | 2001-023602 A | 1/2001 |
|---|---|---|
| JP | 2001-266942 A | 9/2001 |
| JP | 2003-171495 A | 6/2003 |
| JP | 2005-281668 A | 10/2005 |
| JP | 2006-289657 A | 10/2006 |
| JP | 2006289657 A * | 10/2006 |
| JP | 2007-125821 A | 5/2007 |
| JP | 2007125821 A * | 5/2007 |
| JP | 2010-021033 A | 1/2010 |

OTHER PUBLICATIONS

Machine Translation of: JP 2006289657 A, Kizawa, Oct. 26, 2006.*
Machine Translation of: JP 2007125821 A, Nakajima, May 24, 2007.*

* cited by examiner

*Primary Examiner* — Kenneth Douyette
(74) *Attorney, Agent, or Firm* — DLA Piper LLP (US)

(57) ABSTRACT

A composite porous membrane is a composite porous membrane, wherein a porous membrane B including a heat-resistant resin is laminated on the surface of a polypropylene resin of an outermost layer of a porous membrane A composed of at least one layer, wherein at least one of the outermost layers comprises the polypropylene resin. The composite porous membrane satisfies a particular range of peeling strength at the interface between the porous membrane A and the porous membrane B and a particular range of difference between air resistance of the whole composite porous membrane and air resistance of the porous membrane A, provided that the porous membrane A satisfies a particular range of average pore size and porosity.

19 Claims, No Drawings

COMPOSITE POROUS MEMBRANE AND METHOD OF PRODUCING THE SAME

TECHNICAL FIELD

The present invention relates to a composite porous membrane in which a porous membrane comprising a heat-resistant resin is laminated on a porous membrane comprising a polypropylene resin in its outermost layer. The present invention particularly relates to a composite porous membrane useful as a separator for a lithium ion battery, which composite porous membrane has excellent ion permeability and excellent adhesion between a porous membrane comprising a polypropylene resin and a heat-resistant resin membrane.

BACKGROUND ART

Porous membranes made of a thermoplastic resin have been widely used, for example, as a material for separation, selective permeation, and isolation of substances. For example, they have been used as a battery separator used in a lithium ion secondary battery, nickel-hydrogen battery, nickel-cadmium battery, and polymer battery; a separator for an electric double layer capacitor; various filters such as a reverse osmosis filtration membrane, ultrafiltration membrane, and microfiltration membrane; moisture-permeable waterproof clothing; a medical material; and the like. In particular, polyethylene porous membranes and polypropylene porous membranes have been suitably used as a separator for a lithium ion secondary battery or have been under development. The reason is that they are not only characterized by excellent electrical insulating properties, having ion permeability by electrolyte impregnation, and excellent electrolyte resistance/oxidation resistance, but also have such a pore-blocking effect that excessive temperature rise is suppressed by blocking a current at a temperature of about 120 to 150° C. in abnormal temperature rise in a battery. However, when the temperature continues to rise for some reason even after pore blocking, membrane rupture can occur at a certain temperature due to decrease in viscosity of a molten polyethylene or polypropylene constituting the membrane and shrinkage of the membrane. In addition, when left at a constant high temperature, membrane rupture can occur after the lapse of a certain time due to decrease in viscosity of a molten polyethylene or polypropylene and shrinkage of the membrane. This phenomenon is not a phenomenon that occurs only when polyethylene or polypropylene is used, and also when other thermoplastic resins are used, this phenomenon cannot be avoided at or higher than the melting point of the resin constituting the porous membrane.

In particular, a separator for a lithium ion secondary battery is highly responsible for battery properties, battery productivity, and battery safety, and required to have excellent mechanical properties, heat resistance, permeability, dimensional stability, pore-blocking property (shutdown property), the property of preventing melt rupture of a membrane (meltdown prevention property), and the like. With regard to batteries for electric vehicles or hybrid vehicles, lithium ion batteries, the capacity of which can be expected to increase in the future, have been under development; meanwhile, various studies to improve heat resistance, for example, by laminating a heat-resistant resin on a polyolefin porous membrane have been conducted until now because tough mechanical strength, compression resistance, and heat resistance are required. However, in general, when a heat-resistant resin is laminated on a polyolefin porous membrane, the heat-resistant resin layer can peel off during processing of a composite porous membrane, in a slitting step, or in a battery assembly process, in which case it is difficult to ensure safety.

Further, to deal with cost reduction, it is expected that the speed will be faster in a battery assembly process. Thus, the present inventors presume that, for such a high-speed processing as well as for ensuring safety of a battery, troubles such as peeling off of a heat-resistant resin layer are required to be reduced, and even higher adhesion is necessary for that purpose.

Patent Document 1 exemplifies a separator obtained by coating aromatic polyamide (poly(phenylene terephthalamide)) containing $Al(OH)_3$ directly to a polypropylene (PP) microporous membrane subjected to a corona discharge treatment. Patent Document 2 exemplifies a separator for a lithium ion secondary battery obtained by direct application of a polyamide-imide resin to a polyolefin porous membrane so that the membrane thickness is 1 µm and immersion in water at 25° C., followed by drying.

As in the cases of Patent Document 1 and Patent Document 2, in the roll coating method, die coating method, bar coating method, blade coating method, and the like which are commonly used when coating a coating solution directly to a polyolefin porous membrane, infiltration of a resin component into a polyolefin porous membrane is unavoidable because of the shearing force, and significant increase in air resistance and decrease in pore-blocking function occur. In such direct coating methods, a resin component readily fills the inside of pores, consequently causing extreme increase in air resistance. In addition, such methods have a problem in that membrane thickness unevenness of a polyolefin porous membrane is likely to lead to membrane thickness unevenness of a heat-resistant resin layer, which in turn is likely to lead to variation in air resistance.

Patent Document 3 exemplifies an electrolyte-supported polymer membrane obtained by immersion of a nonwoven comprising aramid fibers in a dope containing a vinylidene fluoride copolymer which is a heat-resistant resin, and drying.

Patent Document 4 exemplifies a composite porous membrane obtained by immersion of a polypropylene porous membrane in a dope mainly composed of polyvinylidene fluoride which is a heat-resistant resin, followed by the steps of coagulation, washing with water, and drying.

When a nonwoven comprising aramid fibers is immersed in a heat-resistant resin solution as in Patent Document 3, a heat-resistant porous layer is formed inside and on both surfaces of the nonwoven, and accordingly most of the continuous pores inside the nonwoven will be blocked; consequently, significant increase in air resistance cannot be avoided, and besides a pore-blocking function that determines safety of a separator cannot be obtained.

Also in Patent Document 4, a heat-resistant porous layer is similarly formed inside and both surfaces of a polypropylene porous membrane, and as in Patent Document 3, significant increase in air resistance cannot be avoided; besides it is difficult to obtain a pore-blocking function.

Patent Document 5 discloses a separator having a heat-resistant porous layer comprising para-aramid obtained in such a manner that, when a para-aramid resin solution which is a heat-resistant resin is applied directly to a polyethylene porous film, the polyethylene porous film is impregnated in advance with a polar organic solvent used in the heat-resistant resin solution in order to avoid significant increase in air resistance, and after the heat-resistant resin solution is applied, the polyethylene porous film is made into a white opaque membrane in a thermo-hygrostat set at a temperature of 30° C. and a relative humidity of 65%, and then washed and dried.

In Patent Document 5, there is no significant increase in air resistance, but adhesion between the polyethylene porous film and the heat-resistant resin is extremely low, and it is difficult to ensure safety.

Patent Document 6 discloses a composite porous membrane obtained in such a manner that a polyethylene film is coated with a polyamide-imide resin solution and passed through an atmosphere at 250° C. and 80% RH over 30 seconds to obtain a semi-gel like porous membrane; then a polyethylene porous film with a thickness of 20 μm or 10 μm is laminated on said semi-gel like porous membrane, immersed in an aqueous solution containing N-methyl-2-pyrrolidone (NMP), and then washed with water and dried.

In Patent Document 6, there is no significant increase in air resistance, but adhesion between the polyethylene porous film and the heat-resistant resin is insufficient, and the polyethylene porous film was softer than a polypropylene resin porous membrane and had poor mechanical strength and compression resistance.

As described above, in a composite porous membrane in which a heat-resistant resin layer is laminated on a polyolefin porous membrane or the like that serves as a substrate membrane, the rising range of air resistance widens if the heat-resistant resin is infiltrated into the porous membrane that serves as a substrate in order to improve adhesion of the heat-resistant resin layer. On the other hand, if infiltration of the heat-resistant resin is reduced, the rising range of air resistance can be kept small, but adhesion of the heat-resistant resin layer will be low. Taking into account speeding up in a battery assembly process, the demand for safety will be increasingly greater, but it is difficult to ensure the safety if the adhesion is low. In particular, when a polypropylene-based resin porous membrane obtained by the stretching pore-forming process was used as a porous membrane substrate, it is, in general, extremely difficult to obtain adhesion to a heat-resistant resin layer, and there was not a composite porous membrane that simultaneously provides adhesion of a heat-resistant resin layer and a rising range of air resistance.

PRIOR ART DOCUMENTS

Patent Documents

Patent Document 1: JP 2010-21033 A
Patent Document 2: JP 2005-281668 A
Patent Document 3: JP 2001-266942 A
Patent Document 4: JP 2003-171495 A
Patent Document 5: JP 2001-23602 A
Patent Document 6: JP 2007-125821 A

SUMMARY OF THE INVENTION

Problems to be Solved by the Invention

The present invention provides a composite porous membrane in which a porous membrane comprising a heat-resistant resin layer is laminated on a porous membrane having a polypropylene resin layer as an outermost layer, which composite porous membrane simultaneously provides excellent adhesion of the heat-resistant resin layer and a small rising range of air resistance. Such a composite porous membrane is suitable particularly as a separator for a battery.

Means for Solving the Problems

The present invention has a constitution from (1) to (9) below.

(1) A composite porous membrane used as a separator for a battery, wherein a porous membrane B comprising a heat-resistant resin is laminated on the surface of a polypropylene resin of an outermost layer of a porous membrane A composed of at least one layer, wherein at least one of the outermost layers comprises the polypropylene resin, the composite porous membrane satisfying the following Equations (A) to (D):

$$0.01\ \mu m \leq \text{Average pore size of porous membrane } A \leq 1.0\ \mu m \quad \text{Equation (A);}$$

$$30\% \leq \text{Porosity of porous membrane } A \leq 70\% \quad \text{Equation (B);}$$

$$\text{Peeling strength at interface between porous membrane } A \text{ and porous membrane } B \geq 1.0\ N/25\ mm \quad \text{Equation (C); and}$$

$$20 \leq Y - X \leq 100 \quad \text{Equation (D)}$$

(X is an air resistance (sec/100 cc Air) of the porous membrane A, and Y is an air resistance (sec/100 cc Air) of the whole composite porous membrane).

(2) The composite porous membrane according to (1), wherein the porous membrane A is a laminate of three layers of polypropylene/polyethylene/polypropylene.

(3) The composite porous membrane according to (1) or (2), wherein the heat-resistant resin is a polyamide-imide resin, polyimide resin, or polyamide resin.

(4) The composite porous membrane according to (3), wherein the heat-resistant resin is a polyamide-imide resin having a logarithmic viscosity of not less than 0.5 dl/g.

(5) A method of producing the composite porous membrane according to any one of (1) to (4), comprising the following steps (i) to (iii):

Step (i): A step of coating a heat-resistant resin solution onto a substrate film, and then passing the substrate film through a low humidity zone at an absolute humidity of less than 6 g/m³ followed by a high humidity zone at an absolute humidity of 6 g/m³ to 25 g/m³, thereby forming a heat-resistant resin membrane on the substrate film, Step (ii): A step of providing a porous membrane A composed of at least one layer, wherein at least one of its outermost layers comprises a polypropylene resin; and Step (iii): A step of laminating the heat-resistant resin membrane formed in Step (i) on the surface of the polypropylene resin of the outermost layer of the porous membrane A of Step (ii), and then converting the heat-resistant resin membrane into a porous membrane B by immersion in a coagulation bath, followed by washing and drying, thereby obtaining a composite porous membrane.

(6) The method of producing a composite porous membrane according to (5), wherein the substrate film is peeled off after obtaining a composite porous membrane in Step (iii).

(7) The method of producing a composite porous membrane according to (5) or (6), wherein the substrate film is a polyester-based film or a polyolefin-based film with a thickness of 25 to 100 μM.

(8) The method of producing a composite porous membrane according to any one of (5) to (7), wherein the amount of linear oligomers on the surface of the substrate film is 20 μg/m² to 100 μg/m².

(9) The method of producing a composite porous membrane according to any one of (5) to (8), wherein, in Step (i), the time of passage through the low humidity zone is 3 seconds to 20 seconds, and the time of passage through the high humidity zone is 3 seconds to 10 seconds.

Effects of the Invention

The composite porous membrane of the present invention comprises a porous membrane as a substrate membrane and a heat-resistant resin layer laminated thereon, the porous membrane having an excellent shutdown function and having as an outermost layer a polypropylene-based resin layer having mechanical strength and compression resistance, and simultaneously provides excellent adhesion of the heat-resistant resin layer and a small rising range of air resistance, and therefore can be suitably used particularly for a separator for a battery.

BEST MODE FOR CARRYING OUT THE INVENTION

The composite porous membrane of the present invention is one in which a porous membrane B comprising a heat-resistant resin is laminated on the surface of a polypropylene resin of an outermost layer of a porous membrane A composed of at least one layer, wherein at least one of the outermost layers comprises the polypropylene resin, and one which achieves excellent adhesion of a heat-resistant resin layer using an advanced processing technique without causing a significant increase in air resistance due to lamination.

"Significant increase in air resistance" herein means that the difference between the air resistance of a porous membrane that serves as a substrate membrane (X) and the air resistance of a composite porous membrane (Y) is more than 100 sec/100 cc Air. Further, "excellent adhesion of a heat-resistant resin layer" means a peeling strength of not less than 1.0 N/25 mm, preferably not less than 1.5 N/25 mm, and more preferably not less than 2.0 N/25 mm. When the peeling strength is less than 1.0 N/25 mm, the heat-resistant resin layer can peel off during processing in a battery assembly process. There is no particular upper limit on the peeling strength, and 3.0 N/25 mm will suffice for adhesion.

First, the porous membrane A used in the present invention will be described.

The porous membrane A is composed of at least one layer, and at least one of its outermost layers comprises a polypropylene resin. A method of producing the porous membrane A is not limited, and such a porous membrane A can be produced by a method such as a stretching pore-forming process or a phase separation method.

Examples of the phase separation method include a method in which a porous membrane is obtained, for example, by melt blending polypropylene with a solvent for film formation, extruding the resulting molten mixture from a die, cooling the extrudate to form a gel-like molding, stretching the obtained gel-like molding in at least one axial direction, and removing said solvent for film formation. On the other hand, examples of the stretching pore-forming process include a method in which, for example, a lamellar structure in a sheeted film before stretching is controlled by employing low temperature extrusion and a high draft ratio in melt extrusion of polypropylene, and this is uniaxially stretched to cause cleavages at lamellar interfaces to thereby form voids (i.e., lamella stretching method). Further, also proposed is a method in which, for example, inorganic particles or resin particles that are incompatible with polypropylene are added into polypropylene in large amounts to form a sheet, which is stretched to cause cleavages at interfaces between the particles and a polypropylene resin to thereby form voids. Another example is, for example, the β-crystal method in which β-crystals with low crystal density (crystal density: 0.922 g/cm3) are formed when forming an unstretched sheet by melt extrusion of polypropylene; this is stretched to thereby cause crystal transition to α-crystals with high crystal density (0.936 g/cm$^3$); and pores are formed by the difference in crystal density between the two. In this β-crystal method, a large number of pores are formed in a film after stretching, and therefore it is necessary to selectively form a large amount of β-crystals in an unstretched sheet before stretching. Therefore, in this β-crystal method, it is important to form β-crystals under specific melt crystallization conditions using a β-crystal nucleating agent. As a β-crystal nucleating agent, in addition to quinacridone compounds which have long been used, materials having an even higher β-crystal forming ability have been proposed.

The porous membrane A may be a monolayer membrane or a multi-layer membrane of two layers or more (for example, polypropylene/polyethylene/polypropylene). Examples of the production method in the case where the porous membrane A is a monolayer membrane include the above-described phase separation method, stretching pore-forming process, and the like. On the other hand, when the porous membrane A is a multi-layer membrane of two layers or more, it is only required that at least one surface layer be a polypropylene layer, and the component of the other layer is not restricted. For a production method in the case of a multi-layer membrane of two layers or more, the porous membrane A can be produced, for example, by either the method in which each of the polyolefins constituting A layer and B layer is melt blended with a solvent for film formation; the resulting molten mixtures are fed from each extruder to one die; and gel sheets constituting each component are integrated and co-extruded or the method in which gel sheets constituting each layer are laminated and heat fused. A porous membrane of a multi-layer membrane of two layers or more can be obtained by stretching the gel sheet obtained in at least one axial direction and removing said solvent for film formation. The co-extrusion method is more preferred, because a high interlayer adhesive strength is easily obtained; high permeability is easily maintained because continuous pores are easily formed between layers; and the productivity is excellent.

Further, the polypropylene resin in the porous membrane A preferably has a mass average molecular weight (Mw) of 300,000 or more, more preferably 400,000 or more, and most preferably 500,000 or more, in terms of process workability and mechanical strengths to withstand various external pressures caused when wound around an electrode, such as tensile strength, elastic modulus, elongation, and pin puncture strength. The upper limit of the Mw is 4,000,000 or less and more preferably 3,000,000 or less. When it is more than 4,000,000, fluidity during melt extrusion is poor and it is difficult to form a sheet, which is not preferred. The ratio of Mw to number average molecular weight (Mn), molecular weight distribution (Mw/Mn), of polypropylene is not particularly restricted, and preferably 1.01 to 100 and more preferably 1.1 to 50.

In the present invention, a porous membrane having a polypropylene-based resin layer as an outermost layer is used as a substrate membrane, and the polypropylene-based resin may contain other resins such as a polyethylene resin as long as a polypropylene resin is a principal component. The percentage of the polypropylene resin is not less than 50% by weight in a resin mixture. If the percentage of the polypropylene resin is less than 50% by weight, meltdown property and electrolytic solution retention of the porous membrane A will be reduced, which is not preferred. The percentage of the polypropylene resin is preferably not less than 75% by weight and more preferably not less than 90% by weight.

The polypropylene-based resin may be a copolymer of propylene and other olefins. The content of a propylene unit is not less than 50% by weight in the copolymer. If the percentage of the propylene unit is less than 50% by weight, melt-down property and electrolytic solution retention of the porous membrane A will be reduced, which is not preferred. The percentage of the propylene unit is more preferably not less than 75% by weight and more preferably not less than 90% by weight. Preferred examples of comonomers copolymerized with propylene include unsaturated hydrocarbons; for example, ethylene and α-olefins such as 1-butene, 1-pentene, 1-hexene, 4-methyl-1-pentene, and 1-octene. The pattern of copolymerization is not limited to any pattern of alternating, random, block, and graft.

The porous membrane A needs to have a function of blocking pores in the case of abnormal charge and discharge reaction (pore-blocking function). Accordingly, the melting point (softening point) of the constituent resin is preferably 70 to 150° C., more preferably 80 to 140° C., and most preferably 100 to 130° C. When it is less than 70° C., the pore-blocking function can be activated in normal use to make a battery inoperable, and therefore it is not practical. When it is more than 150° C., the pore-blocking function will be activated after an abnormal reaction has proceeded sufficiently, and therefore there is a concern that safety cannot be ensured. Specifically, it is preferable to have at least one layer mainly composed of a polyethylene-based resin in the porous membrane A. It is preferred that the amount of a polyethylene resin in the polyethylene-based resin be not less than 50% by weight, preferably not less than 75% by weight, and more preferably not less than 90% by weight. Examples of polyethylenes include ultra-high molecular weight polyethylene, high-density polyethylene, medium-density polyethylene, low-density polyethylene, and the like. Further, examples of polymerization catalysts include, but are not limited to, Ziegler-Natta catalysts, Phillips catalyst, metallocene catalysts, and the like, all of which can be used in the porous membrane A of the present invention.

The upper limit of the membrane thickness of the porous membrane A is preferably 40 μm and more preferably 35 μm. The lower limit of the membrane thickness of the porous membrane A is preferably 10 μm and more preferably 15 μm. When it is thinner than 10 μm, the membrane strength and pore-blocking function of practical use sometimes cannot be provided particularly in the case of a battery used in a harsh environment such as an electric vehicle, and when it is thicker than 40 μm, the area per unit volume of a battery case is significantly restricted, which is not suitable for the increase in the capacity of a battery which is expected to progress in the future. When the layer constitution of the porous membrane A is a multi layer of two layers or more, for example, polypropylene/polyethylene/polypropylene, the thickness of one of the polypropylene layers is preferably not less than 3 μm. When it is less than 3 μm, sufficient mechanical strength sometimes cannot be obtained.

The upper limit of air resistance (JIS-P8117) of the porous membrane A is preferably 1000 sec/100 cc Air, more preferably 800 sec/100 cc Air, and most preferably 500 sec/100 cc Air. The lower limit of the air resistance of the porous membrane A is preferably 50 sec/100 cc Air, more preferably 70 sec/100 cc Air, and most preferably 100 sec/100 cc Air.

The upper limit of the porosity of the porous membrane A is 70%, preferably 60%, and more preferably 55%. The lower limit of the porosity of the porous membrane A is 30%, preferably 35%, and more preferably 40%. When the air resistance is higher than 1000 sec/100 cc Air or when the porosity is lower than 30%, sufficient charge and discharge properties, particularly, ion permeability (charge and discharge operating voltage) of a battery and the lifetime of a battery (closely related to the amount of electrolytic solution retained) are not sufficient, and when these limits are exceeded, it is likely that functions of a battery cannot be fully exerted. On the other hand, when the air resistance is lower than 50 sec/100 cc Air or when the porosity is higher than 70%, sufficient mechanical strength and insulation properties cannot be obtained, and it is highly likely that a short circuit occurs during charge and discharge.

The average pore size of the porous membrane A is 0.01 to 1.0 μm, preferably 0.05 to 0.5 μm, and more preferably 0.1 to 0.3 μm because it has a great influence on pore-blocking speed. When it is smaller than 0.01 μm, the anchoring effect of a heat-resistant resin is not readily obtained; thus sufficient adhesion of the heat-resistant resin sometimes cannot be obtained, and besides it is highly likely that the air resistance significantly deteriorates in complexation. When it is larger than 1.0 μm, phenomena can occur, such as slow response of a pore-blocking phenomenon to temperature, shift of a pore-blocking temperature depending on the temperature rise rate to the higher temperature side, and the like.

Further, for the surface condition of the polypropylene layer, an outermost layer of the porous membrane A, when the surface roughness (arithmetic average roughness) is in the range of 0.01 to 0.5 μm, adhesion to the porous membrane B tends to be stronger. When the surface roughness is lower than 0.01 μm, an adhesion-improving effect is not observed, and when it is higher than 0.5 μm, decrease in mechanical strength of the porous membrane A or transcription of irregularities to the surface of the porous membrane B can occur.

The porous membrane B used in the present invention will now be described.

The porous membrane B comprises a heat-resistant resin and serves to support/reinforce the porous membrane A with its heat resistance. Thus, the glass transition temperature of the heat-resistant resin constituting the porous membrane B is preferably 150° C. or higher, more preferably 180° C. or higher, and most preferably 210° C. or higher, and the upper limit is not particularly limited. When the glass transition temperature is higher than a decomposition temperature, it is preferred that the decomposition temperature be in the range described above. When the glass transition temperature is lower than 150° C., a sufficient heat-resistant membrane rupture temperature cannot be obtained, and there is a concern that high safety cannot be ensured.

The heat-resistant resin constituting the porous membrane B is not particularly limited as long as it has heat resistance, and examples thereof include a resin mainly composed of polyamide-imide, polyimide, or polyamide; a resin mainly composed of polyamide-imide is preferred. These resins may be used alone or may be used in combination with other materials.

The case where a polyamide-imide resin is used as a heat-resistant resin will now be described.

In general, synthesis of a polyamide-imide resin is carried out by a common method such as the acid chloride method using trimellitic acid chloride and diamine or the diisocyanate method using trimellitic acid anhydride and diisocyanate, and the diisocyanate method is preferred in terms of production cost.

Examples of the acid component used in the synthesis of a polyamide-imide resin include trimellitic acid anhydride (chloride), a portion of which can be replaced with other polybasic acid or anhydride thereof. Examples thereof include tetracarboxylic acids such as pyromellitic acid, biphenyltetracarboxylic acid, biphenylsulfonetetracarboxylic acid, benzophenonetetracarboxylic acid, biphenyl ether tetracarboxylic acid, ethylene glycol bistrimellitate, and propylene glycol bistrimellitate, and anhydrides thereof; aliphatic dicarboxylic acids such as oxalic acid, adipic acid, malonic acid, sebacic acid, azelaic acid, dodecane dicarboxylic acid, dicarboxypolybutadiene, dicarboxypoly(acrylonitrile-butadiene), and dicarboxypoly(styrene-butadiene); alicyclic dicarboxylic acids such as 1,4-cyclohexanedicarboxylic acid, 1,3-cyclohexanedicarboxylic acid, 4,4'-dicyclohexylmethanedicarboxylic acid, and dimer acid; and aromatic dicarboxylic acids such as terephthalic acid, isophthalic acid, diphenylsulfonedicarboxylic acid, diphenyl ether dicarboxylic acid, and naphthalenedicarboxylic acid. Among them, 1,3-cyclohexanedicarboxylic acid and 1,4-cyclohexanedicarboxylic acid are preferred in terms of electrolyte resistance; dimer acid, and dicarboxypolybutadiene, dicarboxypoly(acrylonitrilebutadiene), and dicarboxypoly(styrene-butadiene) with a molecular weight of 1000 or more are preferred in terms of shutdown property.

Also, a portion of a trimellitic acid compound can be replaced with a glycol to introduce a urethane group into a molecule. Examples of glycols include alkylene glycols such as ethylene glycol, propylene glycol, tetramethylene glycol, neopentyl glycol, and hexanediol; polyalkylene glycols such as polyethylene glycol, polypropylene glycol, and polytetramethylene glycol; polyesters with terminal hydroxyl groups synthesized from one or more of the dicarboxylic acids described above and one or more of the glycols described above; and the like, among which polyethylene glycol and polyesters with terminal hydroxyl groups are preferred in terms of a shutdown effect. The number average molecular weight of them is preferably 500 or more and more preferably 1000 or more. The upper limit is not particularly limited and preferably less than 8000.

When a portion of the acid component is replaced with at least one from the group consisting of dimer acid, polyalkylene ether, polyester, and butadiene rubber containing any one of a carboxyl group, a hydroxyl group, and an amino group at its terminal, it is preferable to replace 1 to 60 mol % of the acid component.

Examples of the diamine (diisocyanate) component used in the synthesis of a polyamide-imide resin include aliphatic diamines such as ethylenediamine, propylenediamine, and hexamethylenediamine, and diisocyanates thereof; alicyclic diamines such as 1,4-cyclohexanediamine, 1,3-cyclohexanediamine, and dicyclohexylmethanediamine, and diisocyanates thereof; aromatic diamines such as o-tolidine, tolylenediamine, m-phenylenediamine, p-phenylenediamine, 4,4'-diaminodiphenylmethane, 4,4'-diaminodiphenyl ether, 4,4'-diaminodiphenylsulfone, benzidine, xylylenediamine, and naphthalenediamine, and diisocyanates thereof; and the like, among which dicyclohexylmethanediamine and a diisocyanate thereof are most preferred in terms of reactivity, cost, and electrolyte resistance, and 4,4'-diaminodiphenylmethane, naphthalenediamine, and diisocyanates thereof are preferred. In particular, o-tolidine diisocyanate (TODI), 2,4-tolylene diisocyanate (TDI), and a blend thereof are preferred. In order particularly to improve adhesion of the porous membrane B, o-tolidine diisocyanate (TODI) which has high stiffness preferably accounts for 50 mol % or more, more preferably 60 mol % or more, and still more preferably 70 mol % or more of total isocyanates.

A polyamide-imide resin can be readily prepared by stirring ingredients in a polar solvent such as N,N'-dimethylformamide, N,N'-dimethylacetamide, N-methyl-2-pyrrolidone, or γ-butyrolactone with heating at 60 to 200° C. In this case, an amine such as triethylamine or diethylenetriamine; an alkali metal salt such as sodium fluoride, potassium fluoride, cesium fluoride, or sodium methoxide; or the like can also be used as a catalyst as required.

When a polyamide-imide resin is used, the logarithmic viscosity is preferably not less than 0.5 dl/g. The reason is that, when the logarithmic viscosity is less than 0.5 dl/g, sufficient meltdown property sometimes cannot be obtained because of a reduced melt temperature and that the porous membrane becomes fragile because of the low molecular weight, and the anchoring effect decreases, which consequently reduces adhesion. On the other hand, the upper limit of the logarithmic viscosity is preferably less than 2.0 dl/g in view of processability and solvent solubility.

The porous membrane B is obtained by coating a heat-resistant resin solution (varnish) obtained by dissolution in a solvent that is able to dissolve a heat-resistant resin and miscible with water to a given substrate film, causing phase separation between the heat-resistant resin and the solvent miscible with water under humidified conditions, and further coagulating the heat-resistant resin by injection into a water bath (coagulation bath).

Examples of solvents that can be used to dissolve the heat-resistant resin include N,N-dimethylacetamide (DMAc), N-methyl-2-pyrrolidone (NMP), hexamethylphosphoric triamide (HMPA), N,N-dimethylformamide (DMF), dimethyl sulfoxide (DMSO), γ-butyrolactone, chloroform, tetrachloroethane, dichloroethane, 3-chloronaphthalene, parachlorophenol, tetralin, acetone, acetonitrile, and the like, and the solvent can be arbitrarily selected depending on the solubility of resins.

Although the solids concentration of the varnish is not particularly restricted as long as the varnish can be applied uniformly, it is preferably 2% by weight to 50% by weight and more preferably 4% by weight to 40% by weight. When the solids concentration is less than 2% by weight, the resulting porous membrane B can be fragile. When it is more than 50% by weight, it can be difficult to control the thickness of the porous membrane B.

Further, to reduce the heat shrinkage rate of the porous layer B and provide slip characteristics, inorganic particles or heat-resistant polymeric particles may be added to the varnish. When the particles are added, the upper limit of the addition amount is preferably 95% by mass. When the addition amount is more than 95% by mass, the percentage of the heat-resistant resin in the total volume of the porous membrane B is small, and sufficient adhesion of the heat-resistant resin to the porous membrane A sometimes cannot be obtained.

Examples of the inorganic particles include calcium carbonate, calcium phosphate, amorphous silica, crystalline glass filler, kaolin, talc, titanium dioxide, alumina, silica-alumina composite oxide particles, barium sulfate, calcium fluoride, lithium fluoride, zeolite, molybdenum sulfide, mica, and the like. Examples of the heat-resistant polymeric particles include crosslinked polystyrene particles, crosslinked acrylic resin particles, crosslinked methyl methacrylate particles, benzoguanamine/formaldehyde condensate particles, melamine/formaldehyde condensate particles, polytetrafluoroethylene particles, and the like.

It is important that the moisture percentage of the varnish be 0.5% by weight or less and preferably 0.3% by weight or less. When it is more than 0.5% by weight, the heat-resistant resin component is likely to coagulate during storage of the varnish or immediately after application, and consequently a required amount of the heat-resistant resin sometimes cannot be impregnated into the porous membrane A. Examples of the method of reducing the moisture percentage of the varnish to 0.5% by weight or less include the method of reducing the moisture percentage of the heat-resistant resin, solvent, and, further, additives such as inorganic particles to 0.5% by weight or less, and, specifically, it is preferable to use raw materials of each after being dewatered or dried. Further, it is desired that the varnish be stored during the time from preparation to coating such that it is exposed to the outside air as little as possible. The moisture percentage of the varnish can be measured using the Karl Fischer method.

The membrane thickness of the porous membrane B is preferably 1 to 5 µm, more preferably 1 to 4 µm, and most preferably 1 to 3 µm. When the membrane thickness is thinner than 1 µm, there is a concern that the membrane rupture strength and insulation properties cannot be ensured when the porous membrane A has molten/shrunk at or higher than the melting point. When the membrane thickness is thicker than 5 µm, the percentage of the porous membrane A in the composite porous membrane is small, and an abnormal reaction sometimes cannot be prevented because a sufficient pore-blocking function cannot be obtained. Further, the size when taken up becomes large, which can be unsuitable for the increase in the capacity of a battery which is expected to progress in the future.

The porosity of the porous membrane B is preferably 30 to 90% and more preferably 40 to 70%. When the porosity is less than 30%, the electrical resistance of the membrane increases, it becomes difficult to apply a high current. On the other hand, when it is more than 90%, the membrane strength tends to weaken. When an air resistance of the porous membrane B is measured by a method in accordance with JIS-P8117, the value obtained is preferably 1 to 1000 sec/100 cc Air, more preferably 50 to 800 sec/100 cc Air, and still more preferably 100 to 700 sec/100 cc Air. When the air resistance is less than 1 sec/100 cc Air, membrane strength weakens, and when it is more than 1000 sec/100 cc Air, cycle characteristics can deteriorate.

The composite porous membrane of the present invention has a relationship of the difference between the air resistance of the porous membrane A (X sec/100 cc Air) and the air resistance of the whole composite porous membrane (Y sec/100 cc Air) (Y–X): 20 sec/100 cc Air≤Y–X≤100 sec/100 cc Air. When Y–X is less than 20 sec/100 cc Air, sufficient adhesion of a heat-resistant resin layer cannot be obtained. When it is more than 100 sec/100 cc Air, significant increase in air resistance is caused, and, as a result, ion permeability decreases when introduced into a battery; therefore, a separator unsuitable for a high-performance battery is provided.

Further, the air resistance of the composite porous membrane is preferably 70 to 1100 sec/100 cc Air, more preferably 200 to 800 sec/100 cc Air, and most preferably 300 to 700 sec/100 cc Air. When the value of the air resistance is lower than 70 sec/100 cc Air, sufficient insulation properties cannot be obtained, and clogging, short circuit, and membrane rupture can be caused. When the value is higher than 1100 sec/100 cc Air, membrane resistance is high, and charge and discharge properties and lifetime properties in a practical range sometimes cannot be obtained.

A method of producing the composite porous membrane of the present invention will now be described.

In the method of producing the composite porous membrane of the present invention, a substrate film such as a polyester-based film or a polyolefin-based film is first coated with a varnish (heat-resistant resin solution) and then passed through a low humidity zone. During this time, phase separation is caused in the varnish between a heat-resistant resin and a solvent that dissolves the resin.

Examples of the method of coating the varnish described above include the reverse roll coating method, gravure coating method, kiss coating method, roll brushing method, spray coating method, air knife coating method, wire bar coating method, pipe doctor method, blade coating method, die coating method, and the like, and these methods can be used alone or in combination.

The low humidity zone in the present invention is a zone where absolute humidity is adjusted to less than 6 g/m$^3$. The upper limit of the absolute humidity is preferably 4 g/m$^3$ and more preferably 3 g/m$^3$, and the lower limit is preferably 0.5 g/m$^3$ and more preferably 0.8 g/m$^3$. When the absolute humidity is less than 0.5 g/m$^3$, a porous membrane is less likely to be provided finally because phase separation does not proceed sufficiently, and the rising range of air resistance can be wide. On the other hand, when the absolute humidity is not less than 6 g/m$^3$, coagulation of the heat-resistant resin starts parallel to the phase separation, and the heat-resistant resin is not sufficiently infiltrated into the porous membrane A when laminating the porous membrane A; consequently, sufficient adhesion of the heat-resistant resin cannot be obtained. The time of passage through the low humidity zone is preferably 3 seconds to 20 seconds. When it is less than 3 seconds, there is a concern that the above-mentioned phase separation does not proceed sufficiently, and, on the other hand, when it is more than 20 seconds, coagulation of the heat-resistant resin can proceed too far.

Then, the coated film is passed through a high humidity zone to form a semi-gel like heat-resistant resin membrane on the substrate film. The high humidity zone in the present invention is a zone where the lower limit of the absolute humidity is adjusted to 6 g/m$^3$, preferably 7 g/m$^3$, and more preferably 8 g/m$^3$ and the upper limit is adjusted to 25 g/m$^3$, preferably 17 g/m$^3$, and more preferably 15 g/m$^3$. When the absolute temperature is less than 6 g/m$^3$, gelation (defluidization) does not proceed sufficiently, and, consequently, when laminating the porous membrane A, infiltration of the heat-resistant resin into the porous membrane A proceeds too far, and the rising range of air resistance increases. When the absolute humidity is more than 25 g/m$^3$, coagulation of the heat-resistant resin proceeds too far, and infiltration of the heat-resistant resin into the porous membrane A is too little; consequently, sufficient adhesion sometimes cannot be obtained. The time of passage through the high humidity zone is preferably 3 seconds to 10 seconds. When it is less than 3 seconds, gelation (defluidization) does not proceed sufficiently, and, consequently, when laminating the porous membrane A, infiltration of the heat-resistant resin into the porous membrane A proceeds too far, and the rising range of air resistance can increase; on the other hand, when it is more than 10 seconds, coagulation of the heat-resistant resin proceeds too far, and infiltration of the heat-resistant resin into the porous membrane A is too little; consequently, there is a concern that sufficient adhesion cannot be obtained.

For both the low humidity zone and the high humidity zone, temperature conditions are not particularly limited as long as the absolute humidity is in the range described above, and preferred is 20° C. to 50° C. from the standpoint of energy saving. Although the thickness of the film substrate described above is not particularly limited as long as it is thick enough to maintain planarity, the thickness of 25 µm to 100 µm is suitable. When it is less than 25 µm, sufficient planarity sometimes cannot be obtained. Also, when it is more than 100 µm, planarity will not improve.

Meanwhile, the porous membrane A composed of at least one layer, wherein at least one of its outermost layers comprises a polypropylene resin, is provided, and then the semi-gel like heat-resistant resin membrane formed as mentioned above is laminated on the surface of the polypropylene resin of the outermost layer of the porous membrane A such that air bubbles are not entrapped. As a method of lamination, a method in which films from two directions are combined on a surface of one metal roll is preferred because of little damage to the films. "Semi-gel like" herein refers to a situation where there coexist regions that have been gelled during the process of gelation of a polyamide-imide resin solution due to absorption of moisture in the atmosphere and regions that have been kept in a state of solution.

For the timing of laminating the porous membrane A on the semi-gel like heat-resistant resin membrane, it is preferable to laminate in at least 10 seconds immediately after passing through the high humidity zone. If the time from exiting the high humidity zone to lamination is more than 10 seconds, coagulation of the heat-resistant resin membrane proceeds, and sufficient adhesion between the porous membrane A and the porous membrane B sometimes cannot be obtained.

After forming a heat-resistant resin membrane, the substrate film may be peeled off, but in the method of the present invention, it is preferable to laminate the porous membrane A on the heat-resistant resin membrane without peeling off the substrate film. When this method is used, a composite porous membrane can be produced even in the case of using such a soft porous membrane A that has a low elastic modulus and shows necking due to tension during processing. Specifically, excellent properties in process workability can be expected; a composite porous membrane does not wrinkle or bend when passing through a guide roll; curling during drying can be reduced; and the like. In this case, the substrate and the composite porous membrane may be taken up simultaneously, or the substrate and the composite porous membrane may be taken up on different taking-up rolls via a drying step, but the latter taking-up method is preferred because there is little concern about winding slippage.

Then, the porous membrane A and heat-resistant resin membrane laminated is immersed in a coagulation bath to cause phase conversion of the heat-resistant resin membrane into a porous membrane B. The composition of the coagulation bath is not particularly restricted, and, for example, the coagulation bath can be an aqueous solution containing a good solvent for the heat-resistant resin constituting the porous membrane B in an amount of 1 to 20% by weight and more preferably 5 to 15% by weight. By immersing in the coagulation bath, the porous membrane B is transcribed to all over the porous membrane A, and an unwashed composite porous membrane is obtained. This is because some portions of the porous membrane B moderately intrude into pores of the porous membrane A and an anchoring effect is expressed.

Further, the unwashed porous membrane described above can be subjected to a washing step using pure water or the like and a drying step using hot air at 100° C. or less to obtain a final composite porous membrane.

For the washing, common methods such as warming, ultrasonic irradiation, and bubbling can be used. Further, for keeping the concentration in each bath constant to increase washing efficiency, the method of removing the solution in a porous membrane between the baths is effective. Specific examples thereof include the method of extruding the solution in a porous layer with air or inert gas, the method of squeezing out the solution in the membrane physically with a guide roll; and the like.

The amount of linear oligomers on a substrate film surface at least at the side to which varnish is applied is preferably 20 $\mu g/m^2$ to 100 $\mu g/m^2$ and more preferably 30 $\mu g/m^2$ to 80 $\mu g/m^2$. When the amount of linear oligomers on a substrate film surface is less than 20 $\mu g/m^2$, the porous membrane B can remain on a substrate film when a composite porous membrane of the porous membrane A and the porous membrane B in a laminated state is peeled off from the substrate film. On the other hand, when it is more than 100 $\mu g/m^2$, coating spots are likely to occur during application of the porous membrane B, and besides process contamination, for example, at a conveying roll can occur due to linear oligomer on a substrate film surface, which is not preferred. In other words, when the amount of linear oligomers on a substrate film surface at least at the side to which varnish is applied is in the range described above, it is easy to simultaneously provide uniformity in application of the porous membrane B and good transcription when a composite porous membrane of the porous membrane A and the porous membrane B in a laminated state is peeled off from the substrate film.

The amount of linear oligomers herein refers to the total amount of linear dimers, linear trimers, and linear tetramers derived from a polyester resin used as a raw material of a substrate film. For example, in the case of polyester comprising as a main repeating unit ethylene terephthalate which is made from terephthalic acid and ethylene glycol, linear dimer means an oligomer that has two terephthalic acid units in one molecule and has a carboxylic acid terminal or a hydroxyl group terminal. Similarly, linear trimer means those which have the same terminal group as that of linear dimer except having three terephthalic acid units in one molecule, and linear tetramer means those which have the same terminal group as that of linear dimer except having four terephthalic acid units in one molecule.

Examples of surface treatment methods for providing a linear oligomer include, but are not limited to, corona discharge treatment, glow discharge treatment, flame treatment, UV irradiation treatment, electron beam irradiation treatment, and ozone treatment. In particular, corona discharge treatment is particularly preferred because it can be carried out with relative ease.

According to the method of the present invention, a composite porous membrane with excellent balance between adhesion and air resistance can be obtained even when the outermost layer of the porous membrane A comprises a polypropylene resin with relatively low porosity.

The composite porous membrane of the present invention can be produced using a polypropylene-based porous membrane slit to a desired width as a porous membrane A, and processing continuously online when producing a polypropylene porous membrane is also possible. Online herein refers to a means for obtaining a composite porous membrane of interest by laminating a porous membrane B continuously after the step of producing a polypropylene porous membrane (specifically, drying step after washing) and carrying out the steps of coagulation, washing, and slitting. Carrying out the online coating described above allows mass production and is very advantageous in terms of cost.

Although the composite porous membrane of the present invention is desirably stored in a dry state, when it is difficult to store in an absolute dry state, it is preferable to perform a vacuum drying treatment at 100° C. or less immediately before use.

The composite porous membrane produced as described above can be used as a separator for batteries such as secondary batteries such as a nickel-hydrogen battery, nickel-cadmium battery, nickel-zinc battery, silver-zinc battery, lithium ion secondary battery, and lithium polymer secondary battery, and is preferably used as a separator particularly for a lithium ion secondary battery. A description will now be made by taking a lithium ion secondary battery as an example.

In a lithium ion secondary battery, a cathode and an anode are laminated with a separator interposed therebetween, and the separator contains an electrolytic solution (electrolyte). A structure of the electrodes is not particularly limited and can be a known structure. For example, the structure can be an electrode structure in which a cathode and an anode in the form of a disk are arranged opposed to each other (coin-type), an electrode structure in which a cathode and an anode in the form of a flat plate are alternately laminated (laminated-type), an electrode structure in which a cathode and an anode in the form of a strip are laminated and wound (wound-type), and the like.

The cathode has a current collector and a cathode active material layer formed on the surface of the current collector containing a cathode active material that is able to occlude and release lithium ions. Examples of cathode active materials include inorganic compounds such as transition metal oxides, composite oxides of lithium and a transition metal (lithium composite oxides), and transition metal sulfides, and examples of transition metals include V, Mn, Fe, Co, Ni, and the like. Preferred examples of lithium composite oxides among the cathode active materials include lithium nickel oxide, lithium cobalt oxide, lithium manganese oxide, layered lithium composite oxides based on $\alpha$-NaFeO2 structure, and the like.

The anode has a current collector and an anode active material layer formed on the surface of the current collector containing an anode active material. Examples of anode active materials include carbonaceous materials such as natural graphite, artificial graphite, cokes, and carbon black. The electrolytic solution can be obtained by dissolving a lithium salt in an organic solvent. Examples of lithium salts include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, $LiN(C_2F_5SO_2)_2$, $LiPF_4(CF_3)_2$, $LiPF_3(C_2F_5)_3$, lower aliphatic carboxylic acid lithium salts, $LiAlCl_4$, and the like. These may be used alone or may be used in combination of two or more. Examples of organic solvents include high-boiling and high-dielectric organic solvents such as ethylene carbonate, propylene carbonate, ethyl methyl carbonate, and $\gamma$-butyrolactone, and low-boiling and low-viscosity organic solvents such as tetrahydrofuran, 2-methyltetrahydrofuran, dimethoxyethane, dioxolane, dimethyl carbonate, and diethyl carbonate. These may be used alone or may be used in combination of two or more. In particular, high-dielectric organic solvents have high viscosity, and low-viscosity organic solvents have a low dielectric constant; therefore, it is preferable to use the two in combination.

When assembling a battery, a separator (composite porous membrane) is impregnated with an electrolytic solution. This provides the separator with ion permeability. In general, the impregnation treatment is performed by immersing a porous membrane in an electrolytic solution at normal temperature. For example, in the case of assembling a cylindrical battery, a cathode sheet, a separator (composite porous membrane), and an anode sheet are first laminated in the order mentioned, and this laminate is taken up from one end to provide a wound-type electrode element. This electrode element is then inserted into a battery can and impregnated with the electrolytic solution described above, and, further, a battery lid that is provided with a safety valve and serves also as a cathode terminal is caulked via a gasket to thereby obtain a battery.

EXAMPLES

A specific description will now be made by way of example, but the present invention is not limited by these Examples. The measured values in Examples were measured by the following method.
(1) Membrane Thickness
A membrane thickness was measured using a contact membrane thickness meter (M-30, digital micrometer manufactured by Sony Manufacturing Corporation).
(2) Peeling Strength at Interface Between Porous Membrane A and Porous Membrane B
An adhesive tape (available from NICHIBAN CO., LTD., No. 405; 24 mm wide) was applied to the porous membrane B surface of separators obtained in Examples and Comparative Examples, and the separators were cut to a width of 24 mm and a length of 150 mm to prepare a test sample.

A peeling strength at the interface between a porous membrane A and a porous membrane B was measured by the peeling method (peel rate: 500 mm/min, T-peel) under the conditions of 23° C. and 50% RH using a tensile tester ["Tensilon®-100" manufactured by A & D Company, Limited]. Measurements were made over time within 100 mm from the start to the end of the measurements, and an average value of the measurements was calculated and converted to a value per 25 mm width, which was employed as a peeling strength. At the peeled interface described above, the porous membrane B surface can remain on the porous membrane A side, but also in this case a value was calculated as a peeling strength at the interface between the porous membrane A and the porous membrane B.
(3) Average Pore Size
An average pore size of a porous membrane A was measured by the following method.

A test piece was fixed onto a cell for measurement using a double-sided tape; platinum or gold was vacuum deposited for several minutes; and measurements were made at an appropriate magnification. Arbitrary 10 points observed at the nearest location on an image obtained by SEM measurement were selected, and an average value of pore sizes at the 10 points was employed as an average pore size of the test piece. In the case where pores are not substantially circular, a value obtained by dividing the sum of a major axis and a minor axis by two was employed as a pore size.
(4) Air Resistance
Using a Gurley densometer type B manufactured by TESTER SANGYO CO., LTD., a composite porous membrane was fixed between a clamping plate and an adapter plate such that wrinkling did not occur, and an air resistance was measured according to JIS P-8117. Two 10-cm square samples were provided, and for each sample, measurements were made at measurement points of the central part and 4 corners of the sample, 10 points in total; the average value of the 10 points was used as an air resistance [sec/100 cc Air]. When the length of a side of a sample is less than 10 cm, a value obtained by measuring at 10 points at intervals of 5 cm may be used.
(5) Logarithmic Viscosity
A solution obtained by dissolving 0.5 g of a heat-resistant resin in 100 ml of NMP was measured at 25° C. using an Ubbelohde viscosity tube.
(6) Glass Transition Temperature
A heat-resistant resin solution or a resin solution obtained by immersing a composite porous membrane in a good solvent to dissolve only an heat-resistant resin membrane was applied at an appropriate gap using an applicator to a PET film (E5001 available from TOYOBO CO., LTD.) or a polypropylene film (PYLEN-OT available from TOYOBO CO., LTD.), predried at 120° C. for 10 minutes, and then peeled. The film obtained was fixed to a metal frame of an appropriate size with a heat-resistant adhesive tape, and, in such a state, further dried under vacuum at 200° C. for 12 hours to obtain a dry film. A test piece 4 mm wide×21 mm long was cut out from the dry film obtained, and using a dynamic viscoelasticity measuring apparatus (DVA-220 manufactured by IT Keisoku Seigyo Co., Ltd.) at a measuring length of 15 mm, a storage elastic modulus (F) was measured in the range from room temperature to 450° C. under the conditions of 110 Hz and a temperature rise rate of 4° C./min. At an inflection point of the storage elastic modulus (F), the temperature at the intersection of an extended baseline at or lower than a glass transition temperature and a tangent line showing a maximum slope at or higher than the inflection point was employed as a glass transition temperature.

(7) Porosity

A 10-cm square sample was provided, and its sample volume (cm$^3$) and mass (g) were measured; a porosity (%) was calculated from the results obtained using the following equation. The sample volume (cm$^3$) of a 10-cm square sample can be determined by 10 (cm)×10 (cm)×thickness of porous membrane A (cm).

Porosity=(1−mass/(resin density×sample volume))×100

(8) Amount of Linear Oligomers on Substrate Film Surface

The surfaces to be extracted of two films were faced each other and fixed to a frame with a spacer interposed therebetween so that an area of 25.2 cm×12.4 cm per film could be extracted. Thirty ml of ethanol was injected between the extract surfaces, and linear oligomers on the film surface were extracted at 250° C. for 3 minutes. The extract was evaporated to dryness, and then dimethylformamide was added to the resulting dried residue of the extract to a volume of 200 μl. Then, using high-performance liquid chromatography, linear oligomers were quantitatively determined from a calibration curve preliminarily determined by the method shown below. The amount of linear oligomers was defined as the sum of dimers, trimers, and tetramers.

(Measurement Conditions)
 Apparatus: ACQUITY UPLC (available from Waters)
 Column: BEH-C18 2.1×150 mm (available from Waters)
 Mobile phase: Eluent A: 0.1% formic acid (v/v)
 Eluent B: Acetonitrile
 Gradient B %: 10→98→98% (0→25→30 minutes)
 Flow rate: 0.2 ml/min
 Column temperature: 40° C.
 Detector: UV-258 nm Example 1

Into a four-necked flask equipped with a thermometer, a cooling tube, and a nitrogen gas introduction tube, 1 mol of trimellitic acid anhydride (TMA), 0.8 mol of o-tolidine diisocyanate (TODI), 0.2 mol of 2,4-tolylene diisocyanate (TDI), and 0.01 mol of potassium fluoride were loaded together with N-methyl-2-pyrrolidone at a solids concentration of 20% and stirred at 100° C. for 5 hours, and then the resulting mixture was diluted with N-methyl-2-pyrrolidone at a solids concentration of 14% to synthesize a polyamide-imide resin solution (a). The polyamide-imide resin obtained had a logarithmic viscosity of 135 dl/g and a glass transition temperature of 320° C.

The polyamide-imide resin solution (a) was diluted with N-methyl-2-pyrrolidone to prepare a varnish (a-1) (solids concentration: 5.5% by weight). A series of operations was carried out in dry steam at a humidity of 10% or less to prevent moisture absorption as much as possible. The moisture percentage of the varnish (a-1) was 0.2% by weight. The varnish (a-1) was applied to the surface of a polyethylene terephthalate resin film (substrate film) with a thickness of 50 μm and a surface linear oligomer amount of 68 μg/m$^2$ by the blade coating method, and the substrate film was passed through a low humidity zone at a temperature of 25° C. and an absolute humidity of 1.8 g/m$^3$ in 8 seconds and continuously passed through a high humidity zone at a temperature of 25° C. and an absolute humidity of 12 g/m$^3$ in 5 seconds to form a semi-gel like heat-resistant resin membrane. After 1.7 seconds from exiting the high humidity zone, a porous membrane A (made of polypropylene, thickness: 20 μm, porosity: 40%, average pore size: 0.10 μm, air resistance: 600 sec/100 cc Air) was laminated on the semi-gel like heat-resistant resin membrane described above, and the laminate was placed into an aqueous solution containing N-methyl-2-pyrrolidone in an amount of 5% by weight, thereafter, washed with pure water, and then dried by passing through a hot-air drying furnace at 70° C., followed by peeling off from the substrate film to obtain a composite porous membrane with a final thickness of 22.9 μm.

Example 2

A composite porous membrane was obtained in the same manner as in Example 1 except that the absolute humidity of the low humidity zone was 4.0 g/m$^3$.

Example 3

A composite porous membrane was obtained in the same manner as in Example 1 except that the absolute humidity of the low humidity zone was 5.5 g/m$^3$.

Example 4

A composite porous membrane was obtained in the same manner as in Example 1 except that the absolute humidity of the high humidity zone was 7.0 g/m$^3$.

Example 5

A composite porous membrane was obtained in the same manner as in Example 1 except that the absolute humidity of the high humidity zone was 16.0 g/m$^3$.

Example 6

A composite porous membrane was obtained in the same manner as in Example 1 except that the time of passage through the low humidity zone and the high humidity zone was 5.3 seconds and 3.0 seconds, respectively, and that the time from the exit of the high humidity zone to lamination of the porous membrane A was 1.1 seconds.

Example 7

A composite porous membrane was obtained in the same manner as in Example 1 except that the time of passage through the low humidity zone and the high humidity zone was 16.0 seconds and 10.0 seconds, respectively, and that the time from the exit of the high humidity zone to lamination of the porous membrane A was 34 seconds.

Example 8

A composite porous membrane was obtained in the same manner as in Example 1 except that a porous membrane having a three-layer structure of polypropylene/polyethylene/polypropylene (thickness: 25 µm, porosity: 40%, average pore size: 0.10 µm, air resistance: 620 sec/100 cc Air) was used as a porous membrane A.

Example 9

A composite porous membrane was obtained in the same manner as in Example 1 except that a porous membrane having a three-layer structure of polypropylene/polyethylene/polypropylene (thickness: 20.5 µm, porosity: 50%, average pore size: 0.10 µm, air resistance: 320 sec/100 cc Air) was used as a porous membrane A.

Example 10

Into a four-necked flask equipped with a thermometer, a cooling tube, and a nitrogen gas introduction tube, 1 mol of trimellitic acid anhydride (TMA), 0.80 mol of o-tolidine diisocyanate (TODI), 0.20 mol of diphenylmethane-4,4'-diisocyanate (MDI), and 0.01 mol of potassium fluoride were loaded together with N-methyl-2-pyrrolidone at a solids concentration of 20% and stirred at 100° C. for 5 hours, and then the resulting mixture was diluted with N-methyl-2-pyrrolidone at a solids concentration of 14% to synthesize a polyamide-imide resin solution (b). The polyamide-imide resin obtained had a logarithmic viscosity of 1.05 dl/g and a glass transition temperature of 313° C. A composite porous membrane was obtained in the same manner as in Example 1 except that a varnish (b) (solids concentration: 5.5% by weight) prepared using the polyamide-imide resin solution (b) instead of the polyamide-imide resin solution (a) was used.

Example 11

Into a four-necked flask equipped with a thermometer, a cooling tube, and a nitrogen gas introduction tube, 1 mol of trimellitic acid anhydride (TMA), 0.60 mol of o-tolidine diisocyanate (TODI), 0.40 mol of diphenylmethane-4,4'-diisocyanate (MDI), and 0.01 mol of potassium fluoride were loaded together with N-methyl-2-pyrrolidone at a solids concentration of 20% and stirred at 100° C. for 5 hours, and then the resulting mixture was diluted with N-methyl 2-pyrrolidone at a solids concentration of 14% to synthesize a polyamide-imide resin solution (c). The polyamide-imide resin obtained had a logarithmic viscosity of 0.85 dl/g and a glass transition temperature of 308° C. A composite porous membrane was obtained in the same manner as in Example 1 except that a varnish (c) (solids concentration: 5.5% by weight) prepared using the polyamide-imide resin solution (c) instead of the polyamide-imide resin solution (a) was used.

Example 12

A polyamide-imide resin solution (a) in an amount of 32.6 parts by mass and alumina particles with an average particle size of 0.5 µm in an amount of 10.5 parts by mass were diluted with 48.4 parts by mass of N-methyl-2-pyrrolidone, and 8.5 parts by mass of ethylene glycol was further added thereto. The resulting mixture was placed into a polypropylene container together with zirconium oxide beads (available from TORAY INDUSTRIES, INC., trade name: "Torayceram beads", diameter: 0.5 mm) and dispersed for 6 hours using a paint shaker (manufactured by Toyo Seiki Seisaku-Sho, Ltd.). Then, the dispersion was filtered through a filter with a filtration limit of 5 µm to prepare a varnish (d) (solids concentration: 30.0% by weight). A composite porous membrane was obtained in the same manner as in Example 1 except that the varnish (d) was used instead of the varnish (a-1).

Example 13

A varnish (e) (solids concentration: 30.0% by weight) was prepared in the same manner except that titanium oxide particles (available from Titan Kogyo, Ltd., trade name: "KR-380", average particle size: 0.38 µm) was used instead of alumina particles. A composite porous membrane was obtained in the same manner as in Example 1 except that the varnish (e) was used instead of the varnish (a-1).

Example 14

A composite porous membrane was obtained in the same manner as in Example 1 except that the amount of the varnish (a-1) applied was adjusted to a final thickness of 21.9 µm.

Example 15

The polyamide-imide resin solution (a) obtained in Example 1 was poured into a water bath of 10 times volume of the resin solution to precipitate a resin component. Then, resin solids were washed thoroughly with water to remove NMP and then dried using a vacuum dryer under the conditions of 180° C. and 24 hours. Thereafter, the resultant was diluted with N-methyl-2-pyrrolidone at a solids concentration of 14% by weight to prepare a varnish (a-2). The moisture percentage of the varnish (a-2) was 0.05% by weight. A composite porous membrane was obtained in the same manner as in Example 1 except that the varnish (a-2) was used instead of the varnish (a-1).

Example 16

A composite porous membrane was obtained in the same manner as in Example 1 except that the absolute humidity of the low humidity zone was 1.2 g/m$^3$.

Example 17

A composite porous membrane was obtained in the same manner as in Example 1 except that the amount of the varnish (a-1) applied was adjusted to a final thickness of 25.0 µm.

Example 18

A composite porous membrane was obtained in the same manner as in Example 1 except that a polyethylene terephthalate resin film with a surface linear oligomer amount of 25 µg/m$^2$ was used as a substrate film instead of the polyethylene terephthalate resin film with a surface linear oligomer amount of 68 µg/m$^2$.

Comparative Example 1

A composite porous membrane was obtained in the same manner as in Example 1 except that the low humidity zone was set at a temperature of 25° C. and an absolute humidity of 7.0 g/m$^3$.

Comparative Example 2

A composite porous membrane was obtained in the same manner as in Example 1 except that the high humidity zone was set at a temperature of 25° C. and an absolute humidity of 5.0 g/m³.

Comparative Example 3

Into a four-necked flask equipped with a thermometer, a cooling tube, and a nitrogen gas introduction tube, 1 mol of trimellitic acid anhydride (TMA), 0.76 mol of o-tolidine diisocyanate (TODI), 0.19 mol of 2,4-tolylene diisocyanate (TDI), and 0.01 mol of potassium fluoride were loaded together with N-methyl-2-pyrrolidone at a solids concentration of 20% and stirred at 100° C. for 5 hours, and then the resulting mixture was diluted with N-methyl-2-pyrrolidone at a solids concentration of 14% to synthesize a polyamide-imide resin solution (f). The polyamide-imide resin obtained had a logarithmic viscosity of 0.45 dl/g and a glass transition temperature of 315° C. A composite porous membrane was obtained in the same manner as in Example 1 except that a varnish (f) prepared using the polyamide-imide resin solution (f) instead of the polyamide-imide resin solution (a) was used.

Comparative Example 4

The porous membrane A used in Example 1 was coated with the varnish (a-1) by the blade coating method, passed through the low humidity zone at a temperature of 25° C. and an absolute humidity of 1.8 g/m³ in 8 seconds and continuously through the high humidity zone at a temperature of 25° C. and an absolute humidity of 12 g/m³ in 5 seconds, and then, after 2 seconds, placed into an aqueous solution containing N-methyl-2-pyrrolidone in an amount of 5% by weight. Thereafter, the resultant was washed with pure water and then dried by passing through a hot-air drying furnace at 70° C. to obtain a composite porous membrane with a final thickness of 22.9 μm.

Comparative Example 5

A composite porous membrane was obtained in the same manner as in Comparative Example 4 except that the porous membrane A used in Example 1 was used with its pores filled with N-methyl-2-pyrrolidone by immersion in N-methyl-2-pyrrolidone in advance.

Comparative Example 6

Production of a composite porous membrane was attempted in the same manner as in Example 1 except that a polyethylene terephthalate resin film with a surface linear oligomer amount of 3 μg/m² was used as a substrate film instead of the polyethylene terephthalate resin film with a surface linear oligomer amount of 68 μg/m². However, when a composite porous membrane of a porous membrane A and a porous membrane B in a laminated state was peeled off from the substrate film, the porous membrane B remained on the film substrate, and a composite porous membrane could not be obtained.

Comparative Example 7

A composite porous membrane was obtained in the same manner as in Example 1 except that the absolute temperature of the high humidity zone was set at 25.5 g/m³.

Conditions for producing a composite porous membrane in Examples 1 to 18 and Comparative Examples 1 to 7 and properties of a porous membrane A and a composite porous membrane are shown in Table 1.

TABLE 1

| | Porous membrane A | | | | Varnish | | | Amount of linear oligomers on substrate film surface (μg/m²) |
|---|---|---|---|---|---|---|---|---|
| | Thickness (μm) | Air resistance (sec/100 ccAir) | Average pore size (μm) | Porosity (%) | Type | Moisture percentage (wt %) | Additive | |
| Example 1 | 20.0 | 600 | 0.10 | 40 | a-1 | 0.20 | additive-free | 68 |
| Example 2 | 20.0 | 600 | 0.10 | 40 | a-1 | 0.20 | additive-free | 68 |
| Example 3 | 20.0 | 600 | 0.10 | 40 | a-1 | 0.20 | additive-free | 68 |
| Example 4 | 20.0 | 600 | 0.10 | 40 | a-1 | 0.20 | additive-free | 68 |
| Example 5 | 20.0 | 600 | 0.10 | 40 | a-1 | 0.20 | additive-free | 68 |
| Example 6 | 20.0 | 600 | 0.10 | 40 | a-1 | 0.20 | additive-free | 68 |
| Example 7 | 20.0 | 600 | 0.10 | 40 | a-1 | 0.20 | additive-free | 68 |
| Example 8 | 25.0 | 620 | 0.10 | 40 | a-1 | 0.20 | additive-free | 68 |
| Example 9 | 20.5 | 320 | 0.10 | 50 | a-1 | 0.20 | additive-free | 68 |
| Example 10 | 20.0 | 600 | 0.10 | 40 | b | 0.20 | additive-free | 68 |
| Example 11 | 20.0 | 600 | 0.10 | 40 | c | 0.20 | additive-free | 68 |
| Example 12 | 20.0 | 600 | 0.10 | 40 | d | 0.20 | Alumina | 68 |
| Example 13 | 20.0 | 600 | 0.10 | 40 | e | 0.20 | Titanium oxide | 68 |

TABLE 1-continued

| | | | | | | | | |
|---|---|---|---|---|---|---|---|---|
| Example 14 | 20.0 | 600 | 0.10 | 40 | a-1 | 0.20 | additive-free | 68 |
| Example 15 | 20.0 | 600 | 0.10 | 40 | a-2 | 0.05 | additive-free | 68 |
| Example 16 | 20.0 | 600 | 0.10 | 40 | a-1 | 0.20 | additive-free | 68 |
| Example 17 | 20.0 | 600 | 0.10 | 40 | a-1 | 0.20 | additive-free | 68 |
| Example 18 | 20.0 | 600 | 0.10 | 40 | a-1 | 0.20 | additive-free | 25 |
| Comparative Example 1 | 20.0 | 600 | 0.10 | 40 | a-1 | 0.20 | additive-free | 68 |
| Comparative Example 2 | 20.0 | 600 | 0.10 | 40 | a-1 | 0.20 | additive-free | 68 |
| Comparative Example 3 | 20.0 | 600 | 0.10 | 40 | f | 0.20 | additive-free | 68 |
| Comparative Example 4 | 20.0 | 600 | 0.10 | 40 | a-1 | 0.20 | additive-free | 68 |
| Comparative Example 5 | 20.0 | 600 | 0.15 | 40 | a-1 | 0.20 | additive-free | 68 |
| Comparative Example 6 | 20.0 | 600 | 0.10 | 40 | a-1 | 0.20 | additive-free | 3 |
| Comparative Example 7 | 20.0 | 600 | 0.10 | 40 | a-1 | 0.20 | additive-free | 68 |

| | Low humidity zone | | High humidity zone | | Composite porous membrane | | | |
|---|---|---|---|---|---|---|---|---|
| | Absolute humidity ($g/m^3$) | Time of passage (sec) | Absolute humidity ($g/m^3$) | Time of passage (sec) | Thickness (μm) | Air resistance (sec/100 ccAir) | Rising range of Air resistance (sec/100 ccAir) | Peeling strength (N/25 mm) |
| Example 1 | 1.8 | 8.0 | 12 | 5.0 | 22.9 | 650 | 50 | 1.5 |
| Example 2 | 4.0 | 8.0 | 12 | 5.0 | 22.9 | 630 | 30 | 1.2 |
| Example 3 | 5.5 | 8.0 | 12 | 5.0 | 22.9 | 624 | 24 | 1.0 |
| Example 4 | 1.8 | 8.0 | 7 | 5.0 | 22.9 | 664 | 64 | 2.4 |
| Example 5 | 1.8 | 8.0 | 16 | 5.0 | 22.9 | 617 | 17 | 1.0 |
| Example 6 | 1.8 | 5.3 | 12 | 3.0 | 22.9 | 680 | 80 | 4.4 |
| Example 7 | 1.8 | 16.0 | 12 | 10.0 | 22.9 | 616 | 16 | 1.0 |
| Example 8 | 1.8 | 8.0 | 12 | 5.0 | 22.9 | 655 | 35 | 1.8 |
| Example 9 | 1.8 | 8.0 | 12 | 5.0 | 22.9 | 374 | 54 | 1.4 |
| Example 10 | 1.8 | 8.0 | 12 | 5.0 | 22.9 | 668 | 68 | 2.4 |
| Example 11 | 1.8 | 8.0 | 12 | 5.0 | 22.9 | 680 | 80 | 4.2 |
| Example 12 | 1.8 | 8.0 | 12 | 5.0 | 22.9 | 616 | 16 | 1.0 |
| Example 13 | 1.8 | 8.0 | 12 | 5.0 | 22.9 | 620 | 20 | 1.1 |
| Example 14 | 1.8 | 8.0 | 12 | 5.0 | 21.9 | 632 | 32 | 1.4 |
| Example 15 | 1.8 | 8.0 | 12 | 5.0 | 22.9 | 685 | 56 | 3.0 |
| Example 16 | 1.2 | 8.0 | 12 | 5.0 | 22.9 | 676 | 76 | 4.3 |
| Example 17 | 1.8 | 8.0 | 12 | 5.0 | 25.0 | 698 | 98 | 2.7 |
| Example 18 | 1.8 | 8.0 | 12 | 5.0 | 22.9 | 648 | 48 | 1.5 |
| Comparative Example 1 | 7.0 | 8.0 | 12 | 5.0 | 22.9 | 612 | 12 | 0.6 |
| Comparative Example 2 | 1.8 | 8.0 | 5 | 5.0 | 22.9 | 702 | 102 | 3.0 |
| Comparative Example 3 | 1.8 | 8.0 | 12 | 5.0 | 22.9 | 792 | 192 | 0.6 |
| Comparative Example 4 | 1.8 | 8.0 | 12 | 5.0 | 22.9 | 768 | 168 | 4.0 |
| Comparative Example 5 | 1.8 | 8.0 | 12 | 5.0 | 22.9 | 608 | 8 | 0.2 |
| Comparative Example 6 | 1.8 | 8.0 | 12 | 5.0 | — | — | — | — |
| Comparative Example 7 | 1.8 | 8.0 | 25.5 | 5.0 | 22.9 | 610 | 9.6 | 0.3 |

INDUSTRIAL APPLICABILITY

The composite porous membrane of the present invention simultaneously provides excellent adhesion of a heat-resistant resin layer and a small rising range of air resistance even when membranes have become thinner and thinner in the future, thereby being suitable for increase in the capacity of a battery, high ion permeability, and high-speed processability in a battery assembly process, in particular, suitable for a separator for a lithium ion secondary battery.

The invention claimed is:

1. A battery separator composite porous membrane comprising a porous membrane B comprising a heat-resistant resin that is free of water-soluble polymers and laminated on a surface of a polypropylene resin of an outermost layer of a porous membrane A comprising at least one layer, wherein the heat-resistant resin being free from water-soluble polymers, wherein at least one of the outermost layers comprises the polypropylene resin, the composite porous membrane satisfying Equations (A) to (D):

$0.01\ \mu m \leq$ Average pore size of porous membrane $A \leq 1.0\ \mu m$   (A);

$30\% \leq$ Porosity of porous membrane $A \leq 70\%$   (B);

Peeling strength at interface between porous membrane $A$ and porous membrane $B \geq 1.0$ N/25 mm   (C); and $20 \leq Y-X \leq 100$   (D)

wherein X is an air resistance (sec/100 cc Air) of the porous membrane A, and Y is an air resistance (sec/100 cc Air) of the composite porous membrane.

2. The composite porous membrane according to claim 1, wherein the porous membrane A is a laminate of three layers of polypropylene/polyethylene/polypropylene.

3. The composite porous membrane according to claim 1, wherein the heat-resistant resin is a polyamide-imide resin, polyimide resin, or polyamide resin.

4. The composite porous membrane according to claim 3, wherein the heat-resistant resin is a polyamide-imide resin having a logarithmic viscosity of not less than 0.5 dl/g.

5. A method of producing the composite porous membrane according to claim 1, comprising steps (i) to (iii):

Step (i): coating a heat-resistant resin solution onto a substrate film, and then passing the substrate film through a low humidity zone at an absolute humidity of less than 6 g/m³ followed by a high humidity zone at an absolute humidity of 6 g/m³ to 25 g/m³, thereby forming a heat-resistant resin membrane on the substrate film, Step (ii): providing a porous membrane A comprising at least one layer, wherein at least one of its outermost layers comprises a polypropylene resin; and Step (iii) laminating the heat-resistant resin membrane formed in Step (i) on a surface of the polypropylene resin of the outermost layer of the porous membrane A of Step (ii), and then converting the heat-resistant resin membrane into a porous membrane B by immersion in a coagulation bath, followed by washing and drying, thereby obtaining a composite porous membrane.

6. The method according to claim 5, further comprising peeling the substrate film after obtaining the composite porous membrane in Step (iii).

7. The method according to claim 5, wherein the substrate film is a polyester-based film or a polyolefin-based film with a thickness of 25 to 100 μm.

8. The method according to claim 5, wherein an amount of linear oligomers on the surface of the substrate film is 20 μg/m² to 100 μg/m².

9. The method according to claim 5, wherein, in Step (i), a time of passage through the low humidity zone is 3 seconds to 20 seconds, and a time of passage through the high humidity zone is 3 seconds to 10 seconds.

10. The composite porous membrane according to claim 2, wherein the heat-resistant resin is a polyamide-imide resin, polyimide resin, or polyamide resin.

11. A method of producing the composite porous membrane according to claim 2, comprising steps (i) to (iii):

Step (i): coating a heat-resistant resin solution onto a substrate film, and then passing the substrate film through a low humidity zone at an absolute humidity of less than 6 g/m³ followed by a high humidity zone at an absolute humidity of 6 g/m³ to 25 g/m³, thereby forming a heat-resistant resin membrane on the substrate film, Step (ii): providing a porous membrane A comprising at least one layer, wherein at least one of its outermost layers comprises a polypropylene resin; and Step (iii): laminating the heat-resistant resin membrane formed in Step (i) on a surface of the polypropylene resin of the outermost layer of the porous membrane A of Step (ii), and then converting the heat-resistant resin membrane into a porous membrane B by immersion in a coagulation bath, followed by washing and drying, thereby obtaining a composite porous membrane.

12. A method of producing the composite porous membrane according to claim 3, comprising steps (i) to (iii):

Step (i): coating a heat-resistant resin solution onto a substrate film, and then passing the substrate film through a low humidity zone at an absolute humidity of less than 6 g/m³ followed by a high humidity zone at an absolute humidity of 6 g/m³ to 25 g/m³, thereby forming a heat-resistant resin membrane on the substrate film, Step (ii): providing a porous membrane A comprising at least one layer, wherein at least one of its outermost layers comprises a polypropylene resin; and Step (iii): laminating the heat-resistant resin membrane formed in Step (i) on a surface of the polypropylene resin of the outermost layer of the porous membrane A of Step (ii), and then converting the heat-resistant resin membrane into a porous membrane B by immersion in a coagulation bath, followed by washing and drying, thereby obtaining a composite porous membrane.

13. A method of producing the composite porous membrane according to claim 4, comprising steps (i) to (iii):

Step (i): coating a heat-resistant resin solution onto a substrate film, and then passing the substrate film through a low humidity zone at an absolute humidity of less than 6 g/m³ followed by a high humidity zone at an absolute humidity of 6 g/m³ to 25 g/m³, thereby forming a heat-resistant resin membrane on the substrate film, Step (ii): providing a porous membrane A comprising at least one layer, wherein at least one of its outermost layers comprises a polypropylene resin; and Step (iii): laminating the heat-resistant resin membrane formed in Step (i) on a surface of the polypropylene resin of the outermost layer of the porous membrane A of Step (ii), and then converting the heat-resistant resin membrane into a porous membrane B by immersion in a coagulation bath, followed by washing and drying, thereby obtaining a composite porous membrane.

14. The method according to claim 6, wherein the substrate film is a polyester-based film or a polyolefin-based film with a thickness of 25 to 100 μm.

15. The method according to claim 6, wherein an amount of linear oligomers on the surface of the substrate film is 20 μg/m² to 100 μg/m².

16. The method according to claim 7, wherein an amount of linear oligomers on the surface of the substrate film is 20 μg/m² to 100 μg/m².

17. The method according to claim 6, wherein, in Step (i), a time of passage through the low humidity zone is 3 seconds to 20 seconds, and a time of passage through the high humidity zone is 3 seconds to 10 seconds.

18. The method according to claim 7, wherein, in Step (i), a time of passage through the low humidity zone is 3 seconds to 20 seconds, and a time of passage through the high humidity zone is 3 seconds to 10 seconds.

19. The method according to claim 8, wherein, in Step (i), a time of passage through the low humidity zone is 3 seconds to 20 seconds, and a time of passage through the high humidity zone is 3 seconds to 10 seconds.

* * * * *